(12) United States Patent
Singh

(10) Patent No.: US 8,953,485 B2
(45) Date of Patent: Feb. 10, 2015

(54) METHOD AND SYSTEM FACILITATING COMMUNICATION BETWEEN USER EQUIPMENT AND EXTERNAL NETWORK

(71) Applicant: Industrial Technology Research Institute, Hsinchu (TW)

(72) Inventor: Shubhranshu Singh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 236 days.

(21) Appl. No.: 13/722,491

(22) Filed: Dec. 20, 2012

(65) Prior Publication Data

US 2014/0179305 A1 Jun. 26, 2014

(51) Int. Cl.
H04W 72/04 (2009.01)
H04W 76/02 (2009.01)

(52) U.S. Cl.
CPC .................... H04W 76/02 (2013.01)
USPC ......... 370/252; 455/410; 455/41.1; 455/41.2; 455/404.2; 455/450; 370/329

(58) Field of Classification Search
USPC ................................ 455/410, 450
See application file for complete search history.

(56) References Cited

U.S. PATENT DOCUMENTS

| | | |
|---|---|---|
| 7,962,921 B2 | 6/2011 | James et al. |
| 2010/0226298 A1 | 9/2010 | Chan et al. |
| 2011/0103253 A1 | 5/2011 | Qi et al. |
| 2011/0202956 A1 | 8/2011 | Connelly et al. |
| 2011/0237257 A1 | 9/2011 | Soliman et al. |
| 2013/0301438 A1* | 11/2013 | Li et al. ............ 370/252 |

(Continued)

FOREIGN PATENT DOCUMENTS

| | | |
|---|---|---|
| GB | 2483090 A | 2/2012 |
| TW | I225732 B | 12/2004 |

(Continued)

OTHER PUBLICATIONS

Paul, S. et al., An asymmetric protocol for digital cellular communications, INFOCOM '95. Fourteenth Annual Joint Conference of the IEEE Computer and Communications Societies. Bringing Information to People. Proceedings. IEEE, 1995, vol. 3, pp. 1053-1062.

(Continued)

Primary Examiner — Charles Appiah
Assistant Examiner — Randy Peaches
(74) Attorney, Agent, or Firm — Tim Tingkang Xia, Esq.; Morris, Manning & Martin, LLP

(57) ABSTRACT

A wireless communication method between a first network and a second network is disclosed. The first network includes UEs such as the first UE and the second UE, a gateway device, and a core network. The disclosed method includes enabling the gateway device to learn UE-related parameters of the UEs by selectively transmitting a first request to the core network or a second request to the UEs before enabling the gateway device to receive the UE-related parameters. The method further includes broadcasting the UE-related parameters to the UEs, and enabling the gateway device to coordinate with the UEs. In doing so, the UE having the data to be transmitted may rely on another UE having the active interface for accomplishing the transmission of the data without switching operation modes of interfaces of the UE having the data to be transmitted.

30 Claims, 7 Drawing Sheets

(56) References Cited

U.S. PATENT DOCUMENTS

| | | | |
|---|---|---|---|
| 2014/0106707 A1* | 4/2014 | Bontu et al. | 455/410 |
| 2014/0162668 A1* | 6/2014 | NA et al. | 455/450 |

FOREIGN PATENT DOCUMENTS

| | | | |
|---|---|---|---|
| WO | 2010075431 A1 | 7/2010 | |
| WO | 2011153507 A2 | 12/2011 | |
| WO | 2012041363 A1 | 4/2012 | |
| WO | 2012056208 A1 | 5/2012 | |

OTHER PUBLICATIONS

3GPP, 3GPP TR22.888 Technical Specification Group Services and System Aspects; Study on Enhancements for MTC (3GPP SA1 2012), 2012.

Chao et al., Power Saving for Machine to Machine Communications in Cellular Network, GLOBECOM Workshops (GC Wkshps), 2011 IEEE, 2011, pp. 389-393.

Ho, et al., Energy-Saving Massive Access Control and Resource Allocation Scheme for M2M Communications in OFDMA Cellular Networks, Wireless Communications Letters, IEEE, 2012, vol. 1(3), pp. 209-212.

Kim, RY, et al., Snoop Based Group Communication Scheme in Cellular Machine-to-Machine Communications, 2010 International Conference on Information and Communication Technology Convergence (ICTC), 2010, pp. 380-381.

3GPP, 3GPP TS 23.682 Architecture Enhancements to facilitate communications with Packet Data Networks and Applications, 2012.

* cited by examiner

700 Computer media product

712 at least one of (a) enable the gateway device to learn user equipment-related parameters of the user equipments including operating modes, identity information, and connection status by selectively transmitting a first request to the core network or transmitting a second request to the user equipments,
(b) enable the gateway device to receive the user equipment-related parameters from the core network in terms of a first set of predetermined messages or from the user equipments in terms of a second set of predetermined messages, and broadcast the user equipment-related parameters to the user equipments in terms of a third set of predetermined messages, and
(c) enable the gateway device to coordinate with the user equipments allowing for the first user equipment to facilitate a communication with the second network through the second user equipment via the core network, depending on an interface operating status of the second user equipment and a spatial relationship between the first user equipment and the second user equipment.

702 Non-propagating signal bearing medium

704 Communication medium

706 Non-transitory computer readable medium

708 Recordable medium

FIG.7

METHOD AND SYSTEM FACILITATING COMMUNICATION BETWEEN USER EQUIPMENT AND EXTERNAL NETWORK

BACKGROUND

1. Technical Field

The present disclosure relates to a method and a system facilitating communication between user equipment (UE) and an external network, and is capable of reducing power consumption of the UE.

2. Related Art

Long term evolution (LTE) of universal mobile telecommunication system (UMTS) has been under discussion by the $3^{rd}$ generation partnership project (3GPP) that standardized UMTS. The LTE system is a communication system that, in case of Machine to Machine (M2M) or Machine Type Communication (MTC), enables a flow of data, e.g., monitored data, from machine to machine and/or from machine to human, with minimal interactions on the part of the human.

With the new energy-hungry applications and UEs with multiple interfaces (e.g. WiFi, Bluetooth, LTE) gaining popularity, how to prolong life of the UEs because of their limited battery power becomes more and more critical.

Frequent interface mode switch from an idle/sleep or detached mode to an active mode and subsequent data path connection establishment procedures on the part of the UEs consumes significant amount of the battery power of the UEs. Accordingly, approach to minimize frequency of the aforementioned mode switches and to avoid subsequent data path connection establishment-related message exchanges undoubtedly reduces the total power consumption of the UEs, thereby extending life spans of the batteries of the UEs.

SUMMARY

A wireless communication method facilitating the communication between a first network and a second network is provided in the present disclosure. The first network includes UEs with M2M capabilities as well as UEs without M2M capabilities, a gateway device, and a core network, when the second network could be another network external to the first network. UE is equipped with LTE/LTE-Advanced interface along with at least one non-3GPP interface such as Bluetooth, WiFi and ZigBee.

The proposed communication method includes enabling the gateway device to learn UE-related parameters including interface modes, identity information, and RRC and PDN connection status by selectively transmitting a first request to the core network or transmitting a second request to the UEs, enabling the gateway device to receive the UE-related parameters from the core network in terms of a first set of predetermined messages or from the UEs in terms of a second set of predetermined messages, and broadcast the UE-related parameters to the UEs in terms of a third set of predetermined messages, and enabling the gateway device to coordinate with the UEs allowing for the first UE to be communicative with the second network through the second UE via the core network, depending on an interface mode of the second UE and a spatial relationship between the first UE and the second UE.

A communication system having the first network with the multiple UEs, the core network, and the gateway device, and the second network is further provided. The gateway device is capable of facilitating the communication between a first UE and the second network. And the gateway device having a first network interface and a second network interface is adapted to: learn UE-related parameters of the UEs including operating modes, identity information, and connection status by selectively transmitting a first request to the core network via the first network interface thereof, or transmitting a second request to the UEs via the second network interface thereof and receiving the UE-related parameters in a first set of predetermined messages from the core network, or receiving the UE-related parameters in a second set of predetermined messages from the UEs, respectively, transmit the UE-related parameters via the second network interface thereof to the UEs in terms of a third set of predetermined messages, and coordinate with the UEs to allow for the first UE to facilitate the communication with the second network through the second UE via the core network, depending on interface operating status of the second UE and a spatial relationship between the first UE and the second UE.

A non-transitory computer readable medium comprising a set of computer instructions when executed by a processing unit of a gateway device for facilitating the communication between the first network and the second network is also provided in the present disclosure. The first network having the gateway device further includes the first UE and the second UE and the core network. The computer instructions when executed by the processing unit cause the processing unit to: enable the gateway device to learn UE-related parameters of the UEs including operating modes, identity information, and connection status by selectively transmitting a first request to the core network or transmitting a second request to the UEs, enable the gateway device to receive the UE-related parameters from the core network in terms of a first set of predetermined messages or from the UEs in terms of a second set of predetermined messages, and broadcast the UE-related parameters to the UEs in terms of a third set of predetermined messages, and enable the gateway device to coordinate with the UEs allowing for the first UE to facilitate the communication with the second network through the second UE via the core network, depending on an interface operating status of the second UE and a spatial relationship between the first UE and the second UE.

BRIEF DESCRIPTION OF THE DRAWINGS

The present disclosure will become more fully understood from the detailed description given herein below for illustration only, and thus are not limitative of the present disclosure, and wherein:

FIG. 7 is a schematic diagram illustrating a non-transitory computer readable media product according to one embodiment of the present disclosure.

DETAILED DESCRIPTION

Figure 1:
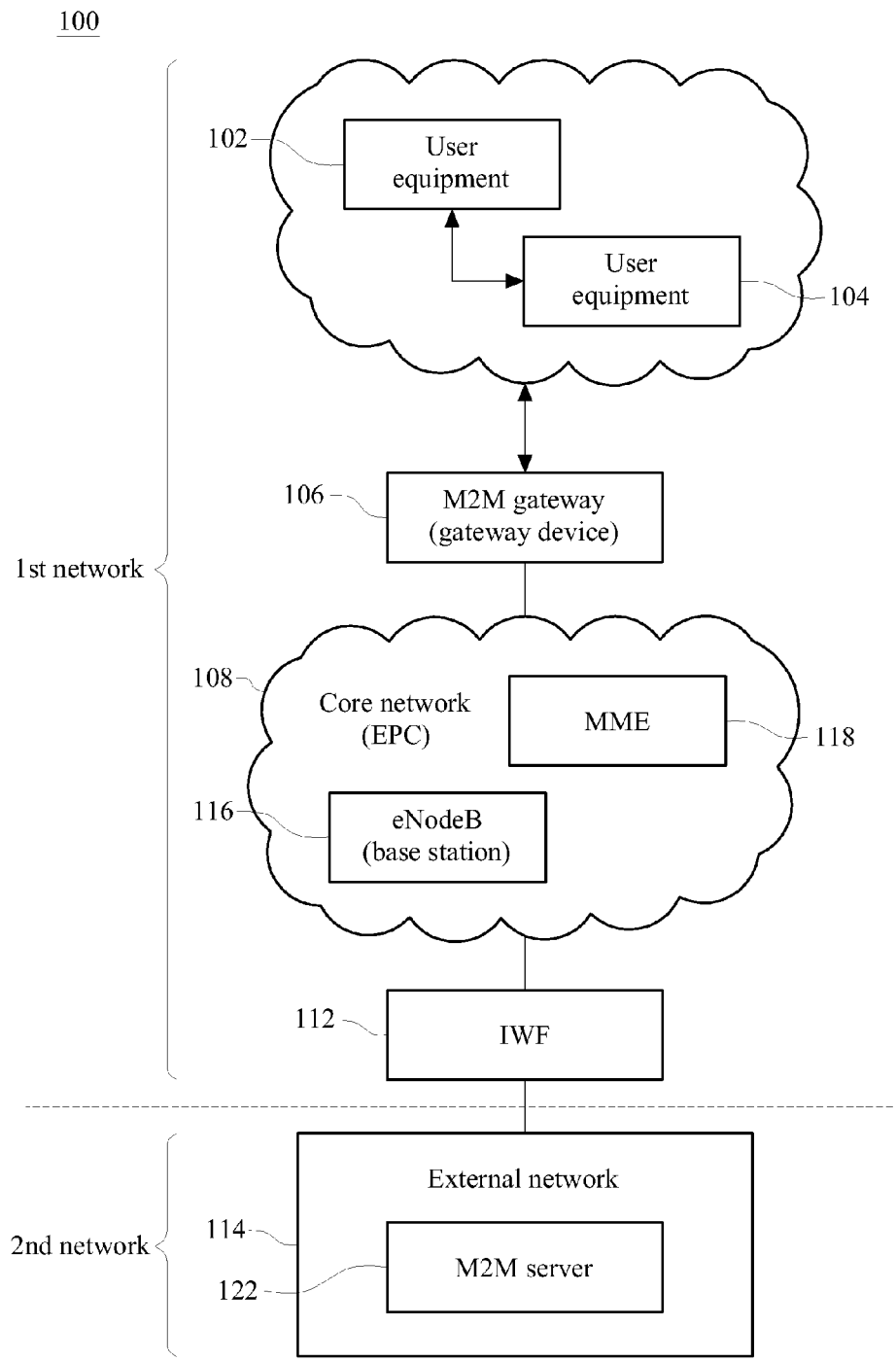
FIG. 1 is a schematic diagram of a communication system according to one embodiment of the present disclosure.

Please refer to FIG. 1 of a schematic diagram of a communication system 100 according to one embodiment of the present disclosure. The communication system 100 may include multiple UEs 102 and 104, a gateway device 106, a core network (or an evolved packet core (EPC)) 108, an inter-working function (IWF) entity 112, and an external network 114. In one implementation, the UEs 102 and 104, the gateway device 106, and the EPC 108 are collectively referred to as an LTE system. In one implementation, the EPC 108 may be a wireless network operating in accordance with the $3^{rd}$ Generation Partnership Project (3GPP) standard and is therefore a 3GPP network. In one implementation, the UEs 102 and 104 may be a mobile station (MS), a user terminal (UT), a subscriber station (SS), or a wireless device capable of Machine to Machine (M2M) or Machine Type Communication (MTC).

The UEs 102 and 104, the gateway device 106, the core network 108, and the IWF entity 112 collectively may be referred to as a first network while the external network 114 may be considered as a second network in the context of the present disclosure.

The UEs 102 and 104 may be communicative with the gateway device 106 through a wired interface or a wireless interface. In one implementation, the wireless interface for the communication between the UEs 102 and 104 and the gateway device 106 may be a non-3GPP interface such as a Bluetooth interface, a radio-frequency identification (RFID) interface or a WiFi interface.

Meanwhile, in one implementation the core network 108 may further include a mobile management entity (MME) 118 providing an end point of a session and mobility management function for the UEs 102 and 104. Specifically, the gateway device 106 may be in communication with a new MME despite communicating with another MME or an old MME/serving GPRS support node (SGSN) previously. The core network 108 may further include a serving gateway (GW), a packet data network (PDN) GW, a policy and charging rules function (PCRF), and home subscriber server (HSS). Each of these components has been defined in the 3GPP standard and will not be explained further in the present disclosure.

The external network 114 may further include an M2M server 122 for receiving the data from the UEs 102 and 104 for additional processing or analysis. The IWF 112 may serve as interface between the core network 108 and the M2M server 122 in the external network 114. It is worth noting that despite the IWF 112 is shown as a separated entity in FIG. 1 the IWF 112 may be integrated or incorporated into the core network 108 in another implementation.

Figure 2:
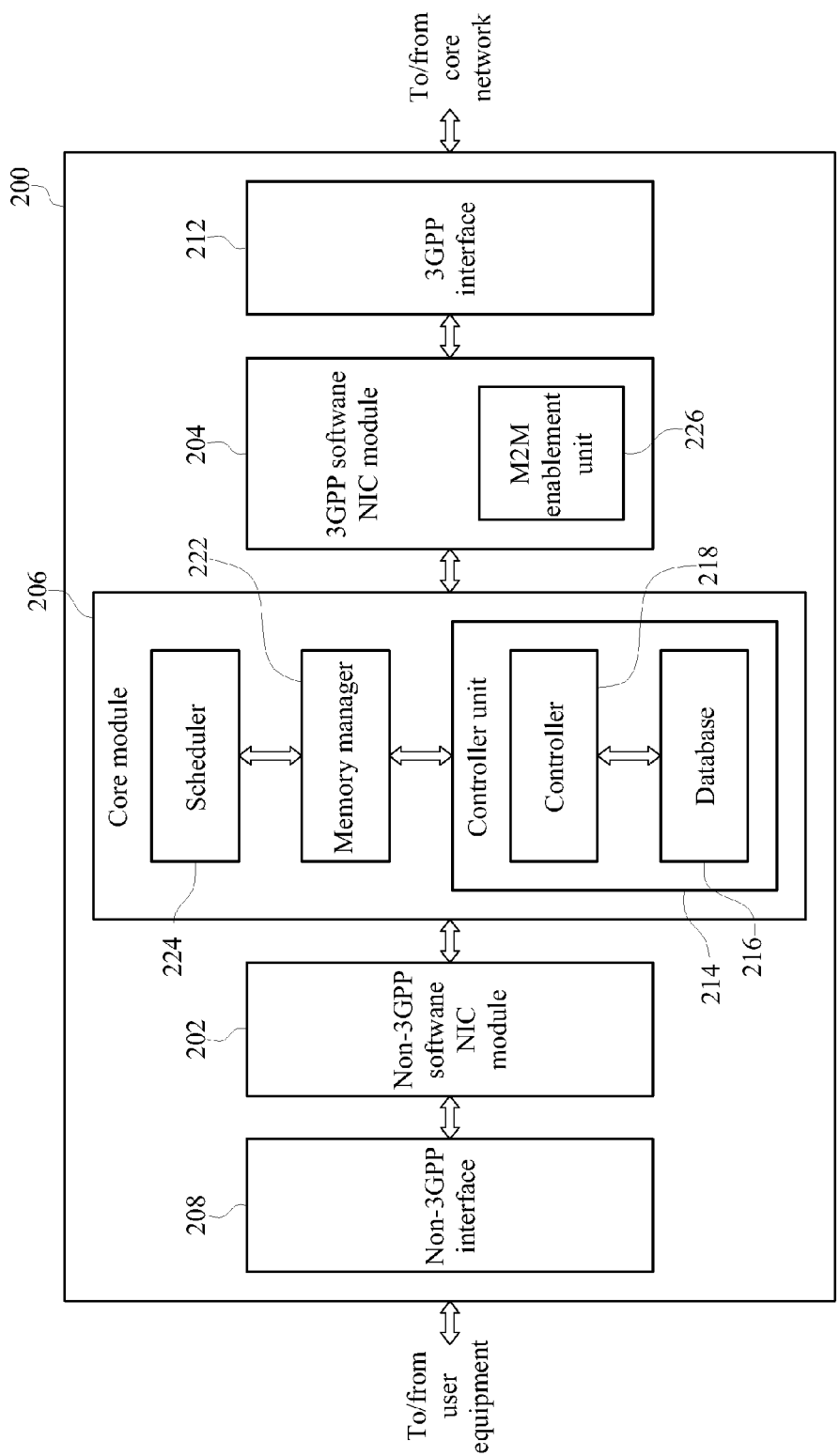
FIG. 2 is a simplified block diagram of a gateway device according to one embodiment of the present disclosure.

In conjunction with FIG. 1, FIG. 2 is a simplified block diagram of a gateway device 200 according to one embodiment of the present disclosure. The gateway device 200 may include a non-3GPP network interface controller (NIC) module 202 for communicating with the UEs 102 and 104 shown in FIG. 1, a 3GPP NIC module 204 for communicating with the core network 108, and a core module 206. It is worth noting that the 3GPP NIC software module 202 and the non-3GPP NIC software module 204 may be in another implementation replaced by hardware-based 3GPP and non-3GPP NIC modules, respectively.

The gateway device 200 may further include a non-3GPP interface 208 as one example of a first network interface and a 3GPP interface 212 as one example of a second network interface for facilitating the communication with the UEs 102 and 104 and the core network 108, respectively.

The core module 206 may further include an M2M controller unit 214 having a database 216 and a controller 218 for storing information regarding the UEs 102 and 104 in the database 216 and retrieving the same from the database 216. The core module 206 may further include a memory manager 222 for managing the usage of the database 216 and a scheduler 224 for scheduling the communication between the gateway device 200 and the UEs 102 and 104 and the gateway device 200 and the core network 108.

The 3GPP NIC software module 204 may further include an M2M enablement unit 226 in addition to a standard 3GPP protocol stack, and the M2M enablement unit 226 may be adapted to enable control and monitoring of the UEs 102 and 104 through the core network 108. The M2M enablement unit 226 may initiate an attachment process with the core network 108 in order to enable the control/monitoring of the UEs 102 and 104. And the M2M enablement unit 226 may, after the completion of the attachment process, periodically or non-periodically transmit initial information of the UEs 102 and 104 to the core network 108. The initial information transmitted from the gateway device 106/200 (or the M2M enablement unit 226 thereof) may be received from the UEs 102 and 104. The initial information of the UEs 102 and 104 may be one or more group identifications for the UEs 102 and 104 as one or more groups, a list of individual identifications of the UEs 102 and 104, and a number of the UEs 102 and 104 in each of the groups that are connected to the gateway device 106/200.

The MME 118 thereafter may perform an authentication process for the gateway device 108, and send a delete-session request to the serving GW to terminate any previous communication session between the gateway device 108 and the old MME/SGSN, before PDN GW could indicate to the PCRF that resources for the previous communication session have been released. The MME 118 may also send a create-session request to the serving GW, which may in turn transmit a create-session response to the new MME to indicate the creation of the new communication session. As the result, a MME database of the core network 108 (not shown) may be updated accordingly.

The MME database may be further updated as the result of a status change to at least one of the UEs 102 and 104. In one implementation, the status change may encompass joining of additional UE, and departure of one of the UEs (for example, the UE 102) from the group of the UEs 102 and 104. Further, the MME database may be also updated according to changes to operating modes of the UEs 102 and 104.

With the updated MME database, the gateway device 106/200 may learn UE-related parameters from the MME database. The gateway device 106/200 may be adapted to transmit a first request to the core network 108, which may respond to the gateway device 106/200 with requested UE-related parameters retrieved from the MME database. In one implementation, the UE-related parameters may be a first predetermined set of messages including but not limited to the operating modes of other UEs in the proximity of one UE, radio resource control (RRC) connection status and parameters, PDN connection status and parameters, LTE interface current operation modes, and direct-mode communication capability (for example, proximity-based service capability).

After learning the UE-related parameters of the UEs 102 and 104, the gateway device 106/200 may "broadcast" the same to all of the UEs including UEs 102 and 104. This broadcasting may be performed over the gateway device's non-3GPP interface such as the non-3GPP interface 208. For example, by broadcasting the UE-related parameters the gateway device 106/200 may enable the UE 102 to know the UE-related parameters of the UE 104. In doing so, the gateway device 106/200 may help facilitate the communication between the UE 102 and the external network 114 through the UE 104 if necessary. Specifically, assume that UEs 102 and 104 are both capable of communicating with each other directly as indicated by the "Direct-mode communication capability" of the UE-related parameters and LTE interface of the UE 102 are in idle/sleep operating mode while LTE interface of the UE 104 operating in active state as indicated by the "interface mode" of the user-equipment parameters. The data to be delivered to the external network 114 may then be transmitted from the UE 102 to the UE 104 first using the direct-mode communication over non-3GPP interface. Thereafter, the UE 104 may forward the same data to the M2M server 122 using its LTE interface with existing PDN connection.

The gateway device 106/200 may also learn the UE-related parameters of the UEs 102 and 104 by receiving the same from the UEs 102 and 104 through the non-3GPP interface 208 thereof. And for receiving the UE-related parameters of the UEs 102 and 104 an attachment process between the gateway device 106/200 and the UEs 102 and 104 may need to be accomplished. And for receiving the UE-related parameters of the UEs 102 and 104 the gateway device 106/200 after the completion of the corresponding attachment process may periodically or non-periodically ask for the UE-related parameters from the UEs 102 and 104 by transmitting second requests to the UEs 102 and 104. In response to the second requests from the gateway device 106/200, the UEs 102 and 104 may transmit their UE-related parameters in a second set of predetermined messages. The second set of the predetermined messages may include identification information, direct-mode communication capability, RRC and PDN connection status and relevant parameters, international mobile subscriber identity (IMSI), connection end points (for example, the M2M server 122), and the operating modes of the UE 102 and 104.

With the received UE-related parameters from the respective UEs, the gateway device 106/200 may broadcast the UE-related parameters to all of the UEs 102 and 104, in terms of a third set of predetermined messages. The third set of the predetermined messages may be, in case the non-3GPP interface is the WiFi-based interface, an extended version of Beacon messages.

The third set of the predetermined messages broadcasted by the gateway device 106/200 to the UEs 102 and 104 may render possible utilizing of active LTE interface of the UE 104 for the transmission of the data of the UE 102 when the LTE interface of the UE 102 is in the idle state.

That relying on the active interface of the UE (e.g., the UE 104) without causing the idle or detached interfaces of the UE from which the data originates (e.g., the UE 102) to be switched to their active operating mode, power consumption associated with the prolonged active mode of operation, transmit power related to new RRC and PDN connection establishment/re-establishment may be saved.

Figure 3:
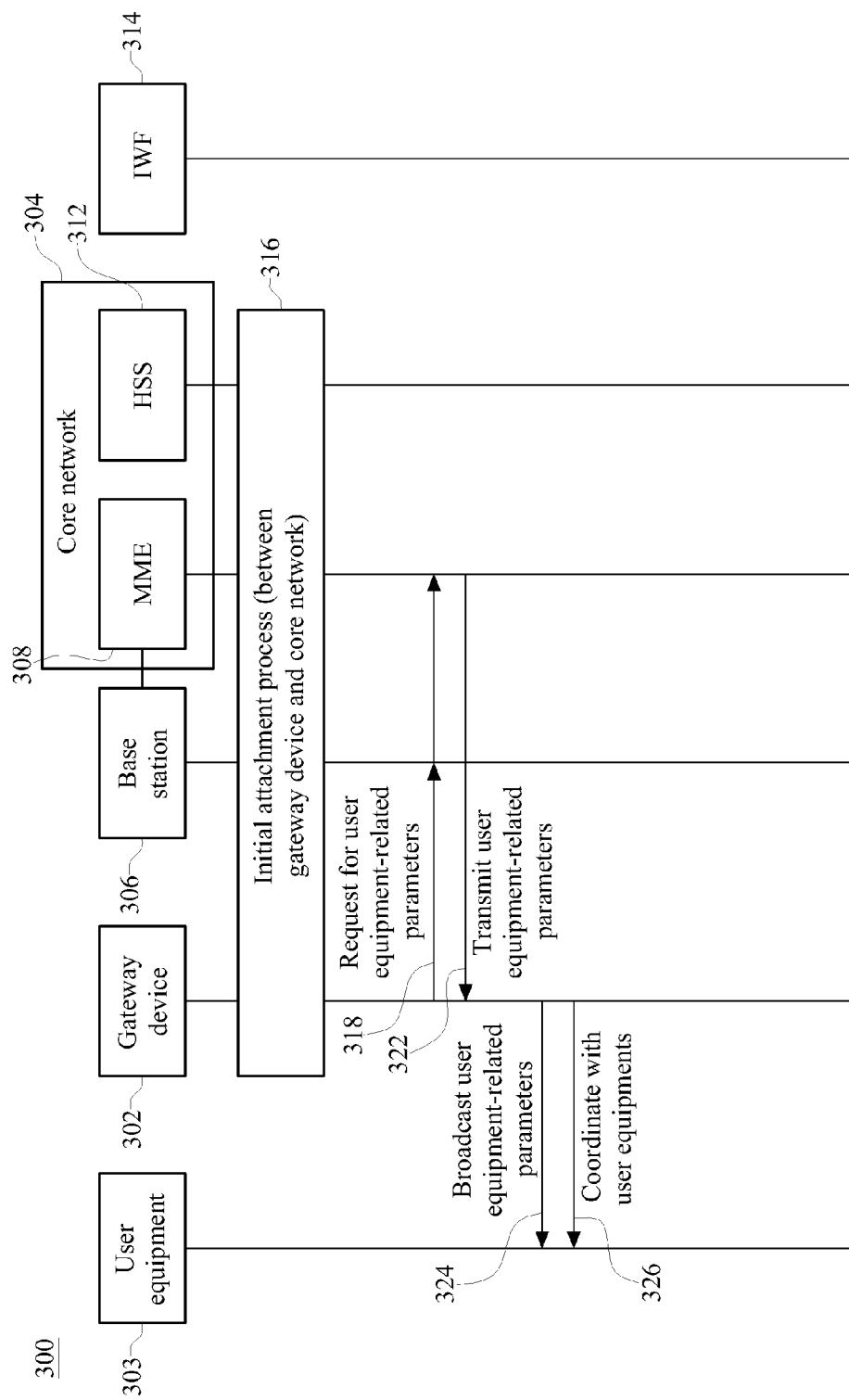
FIG. 3 illustrates a process for a gateway device to learn UE-related parameters of UEs from a core network according to one embodiment of the present disclosure.

FIG. 3 illustrates a process 300 for a gateway device 302 to learn UE-related parameters of one UE 303 from a core network 304 according to one embodiment of the present disclosure. The core network 304 may further include a MME 308, and a HSS 312. The core network 304 may be further connected to an IWF 314 so that communication between the UE 303 and an external network (e.g., the external network 114) may be established through the IWF 314. After the gateway device 302 successfully attaches to the core network 304 (or effectively attaches the base station 306, the MME 308, and the HSS 312) in step 316, the gateway device 302 may ask for UE-related parameters from the core network 304 by transmitting a first request (step 318). It is worth noting that the attachment process between the gateway device 302 and the core network 304 may involve other components such as serving GW, PDN GW, and PCRF as previously mentioned.

The first request for the UE-related parameters may be received by the base station 306 before being received and processed by the MME 308. The MME 308 thereafter may respond the requested UE-related parameters in the first set of the predetermined messages to the gateway device 302 (step 322). With the requested UE-related parameters, the gateway device 302 may broadcast the same to the UEs including the UE 303, in terms of the third set of the predetermined messages (step 324). Thereafter, the gateway device 302 may coordinate with the UEs for facilitating the communication between the UE 303 and the external network (step 326).

For example, when the UE 303 as the first UE needs to transfer the data thereof without having any LTE interface thereof operating in the active mode, the first UE 303 may determine whether/which UE in the proximity of the first UE 303 may be relied on by the first UE 303 based on the information received from the gateway device 302. Specifically, the gateway device 302 may take into account spatial relationship (e.g., the distance) between the first UE 303 and the second and the third UEs when both the second and the third UEs are within the defined proximity from the first UE 303 and have active interfaces available. On the other hand, when the third UE is the only UE in the proximity of the first UE 303 that has the active interface the third UE may be utilized for the transmission of the data of the first UE 303, despite the second UE is closer to the first UE 303 than the third UE. It is also worth noting that the gateway device 302 coordinating for the available UEs on behalf of the first UE may be performed before the broadcasting of the UE-related parameters to the UEs.

Figure 4:
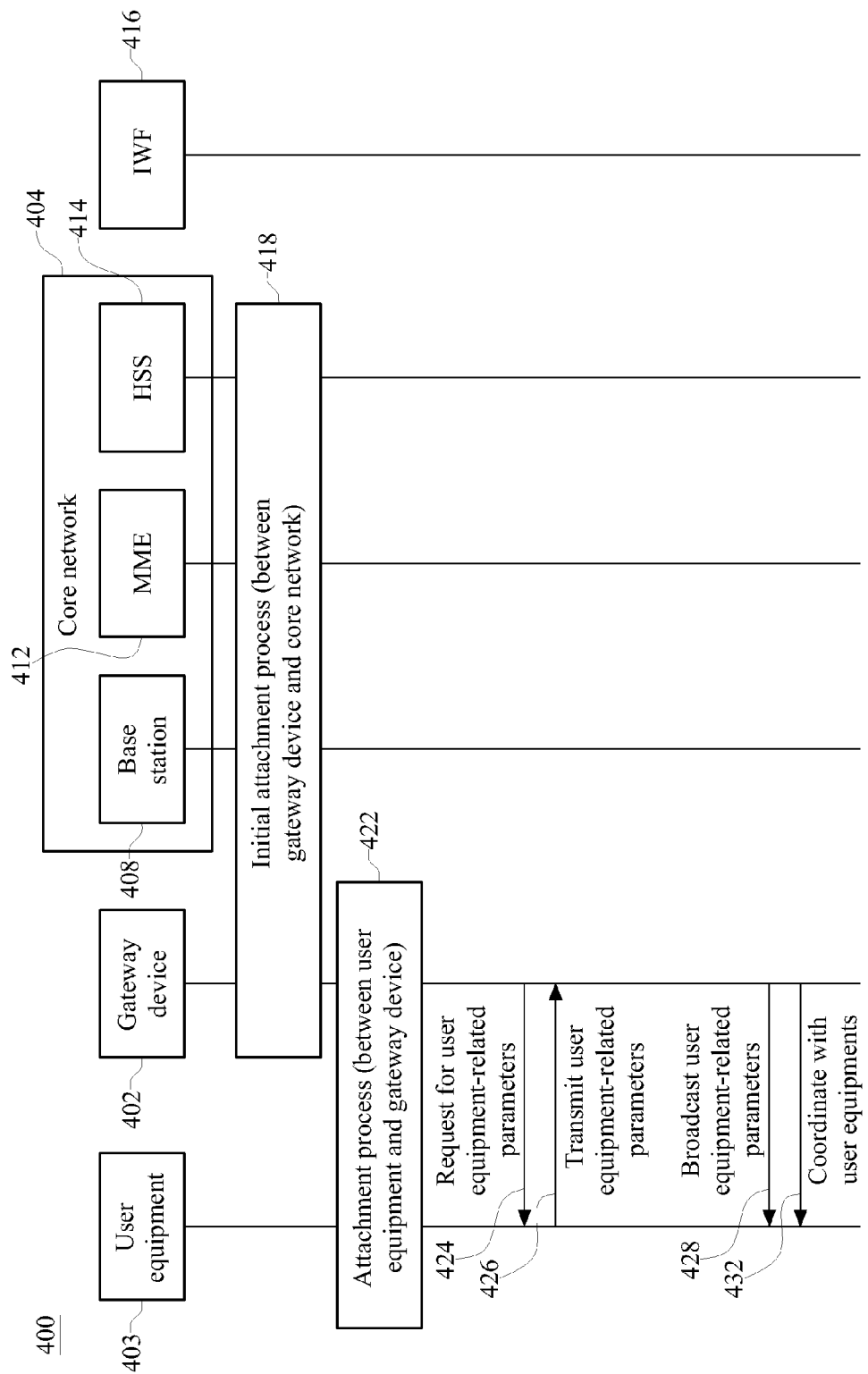
FIG. 4 illustrates a process for a gateway device to learn UE-related parameters of UE from the UE itself according to one embodiment of the present disclosure.

FIG. 4 illustrates a process 400 for a gateway device 402 to learn UE-related parameters of one UE 403 from the UE 403 according to one embodiment of the present disclosure. The core network 404 may further include a base station 408, a MME 412, and a HSS 414. The core network 404 may be further connected to an IWF 416 so that communication between the UE 403 and an external network (e.g., the external network 114) may be established through the IWF 416.

The gateway device 402 is successfully attached to the core network 404 (or effectively attached to the base station 408, the MME 412, and the HSS 414) after step 418 in which an initial attachment between the gateway device 402 and the core network 404 may be performed. The UE 403 may perform an attachment procedure with the gateway device 402 over its non-3GPP interface (for example, a WiFi interface) (step 422). Thereafter, instead of asking for UE-related parameters from the core network 404 the gateway device 402 may transmit a second request to the UE 403 for the UE-related parameters of the UE 403 (step 424).

In response to the receipt of the second request, the UE 403 may transmit the requested information such as Radio Resource Control (RRC) connection status and parameters, PDN connection status and parameters, its LTE interface current operation modes, and the direct-mode communication capability (for example, the proximity-based service capability) in terms of the second set of the predetermined messages to the gateway device 402 (step 426).

Upon learning the UE-related parameters from the UE 403 and/or the UE-related parameters from other UEs, the gateway device 402 may broadcast the same to all the UEs including the UE 403, in terms of the third set of the predetermined messages (step 428). Additionally, the gateway device 402 may coordinate with the UEs including the UE 403. Coordinating the UEs may enable UE 403 to utilize the active interface of one of the UEs in its proximity for transmission of its data from the UE 403 to the external network, without causing the idle LTE interface of the UE 403 and other UEs in the idle/sleep operating modes to be switched to their active operating modes.

By relying on the available active interface of the UE without causing the idle interfaces of the UE from which the data originates to be switched to their active operating modes, the power consumption associated with the prolonged active mode of operation may be reduced. At the same time the power consumption associated with establishing new RRC and PDN connection and re-establishing the same may be reduced also.

Figure 5:
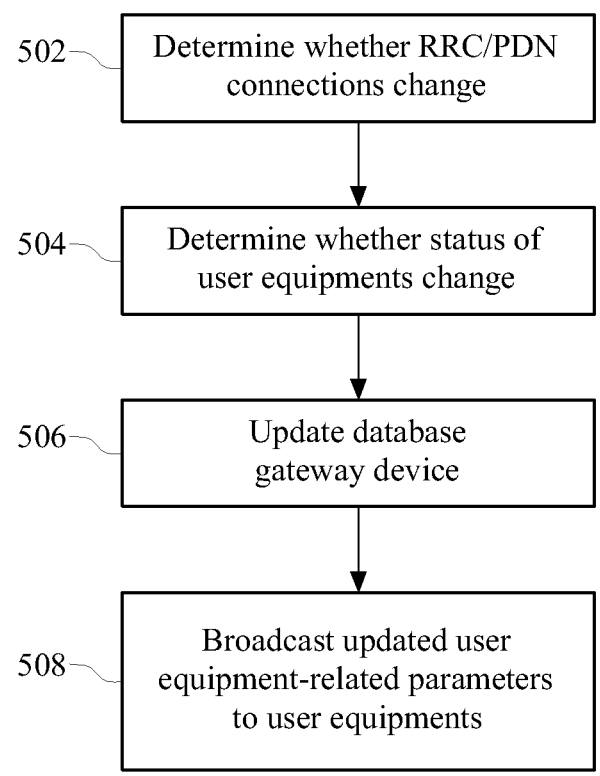
FIG. 5 shows a flow for a gateway device to update its database reflecting dynamically changing UE-related parameters learned either from the core network or the UE according to one embodiment of the present disclosure.

In conjunction with FIG. 2, FIG. 5 shows a flow 500 for a gateway device 200 to update its database 216 when learning new or updated UE-related parameters either from core network or directly from UEs according to one embodiment of the present disclosure. With the learned UE-related parameters, the gateway device 200 may determine whether the learned UE-related parameters are different to those stored in the database 216. For example, the gateway device 200 may determine whether the PDN connection and the RRC connection change (step 502), and determine whether status of the UEs (e.g., joining and/or departure from other UEs) change (step 504). Thereafter, the gateway device 200 may update the database 216 thereof based on whether the aforementioned example changes occur (step 506). And the gateway device 200 may further broadcast the updated UE-related parameters to the UEs as previously discussed (step 508).

Figure 6:
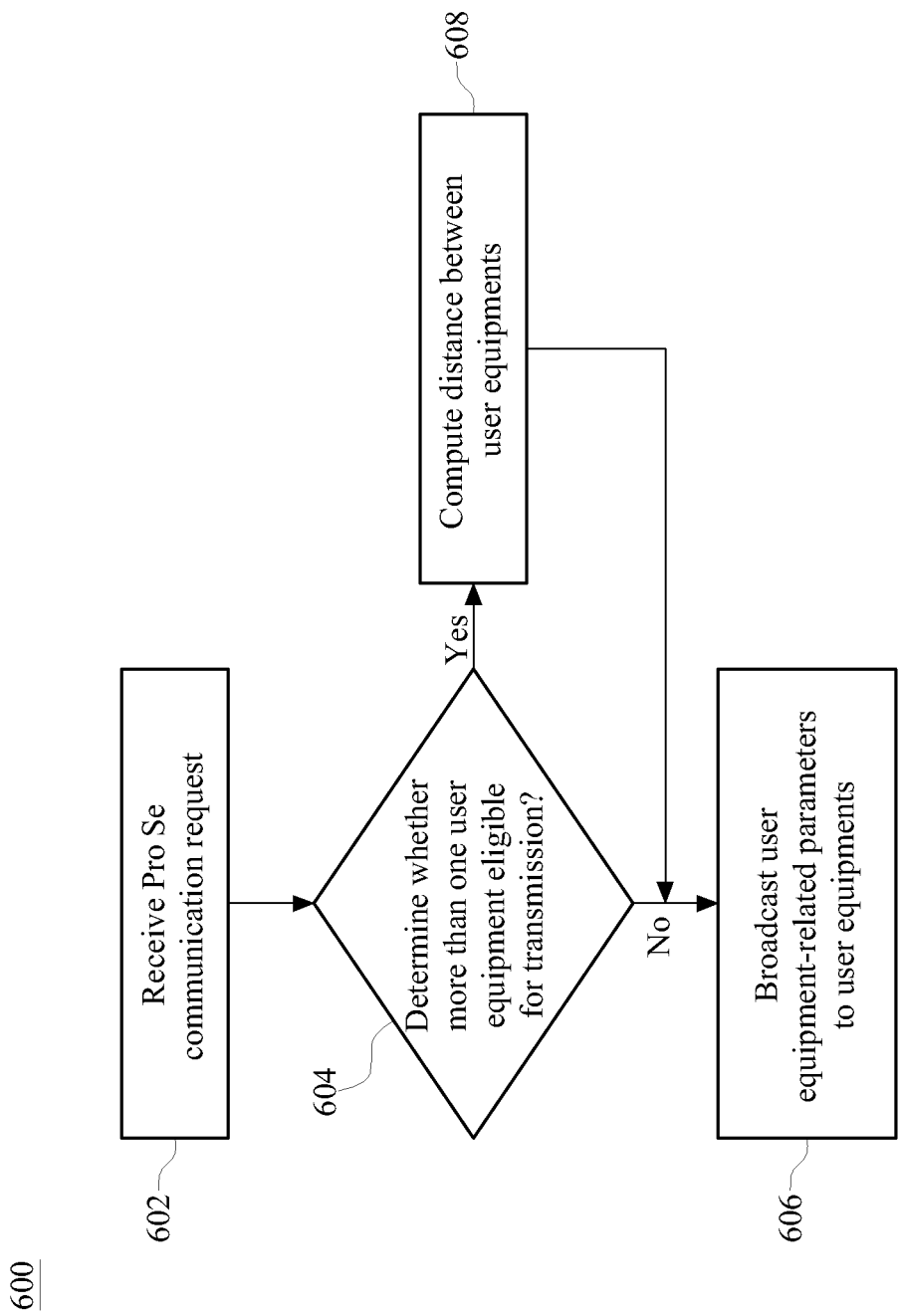
FIG. 6 shows a flow for a gateway device to coordinate UEs that are in direct communication according to one embodiment of the present disclosure.

In conjunction with FIG. 2, FIG. 6 shows a flow 600 for a gateway device 200 to coordinate UEs that are in the direct-mode communication (or in one implementation, Pro Se communication) according to one embodiment of the present disclosure. At the time one UE having the data to be transmitted (e.g., the first UE) has no active interface available and thus requires the transmission of the data through the active interface of another UE, it is possible that more than one UE (for example, the second UE and the third UE) in the proximity of the first UE) that has the available active interface). The availability of more than one UE having the interface in the active operating mode for the transmission of the data from the first UE may be acknowledged by the gateway device 200 according to the receipt of their corresponding UE-related parameters (step 604). The gateway device 200 may need to pick either the second UE or the third UE for the transmission of the data originating from the first UE by computing the distance from the second UE and the third UE to the first UE, before the gateway device 200 may broadcast the UE-related parameters including which UE has been picked for the transmission of the data of the first UE as shown in step 606. That the computation of the distance between the first UE and the second UE or the third UE may serve as the basis for the pick of the UE for the transmission of the data from the first UE is because the distance also affects the overall consumption for that particular transmission. As such, generally the UE that is closer to the UE having the data to be transmitted may be selected by the gateway device 200.

In addition to the distance between the first UE and the second UE and the third UE, the gateway device 200 may also take into account the power consumption required for the transmission of the data regardless of the distance, and possible existence of interferences associated with certain transmission paths involving the UEs to be picked.

When only one UE is available for the transmission of the data from the first UE (No in step 604), the gateway device 200 may designate that particular UE for the transmission of the data on behalf of the first UE without computing the distance between the UEs. Otherwise, the gateway device 200 may compute the distance among other factors between the UEs (step 608).

Once upon the second UE is picked for the data transmission of the first equipment, the gateway device 200 may broadcast the updated UE parameters to the UEs including the first, the second, and the third UEs. As such, the gateway device 200 may further pick the third UE for data transmission of another UE (for instance, the fourth UE) without the active interface available at the time the data is to be transmitted.

It is worth noting that before the gateway device 200 is adapted to determine if there is more than one UE with the active interface is available for the transmission of the data from the first UE the gateway device 200 may receive a direct-mode communication request from the first UE (step 602).

In conjunction of FIG. 2, FIG. 7 is a schematic diagram illustrating a non-transitory computer readable media product 700 according to one embodiment of the present disclosure. The non-transitory computer readable media product 700 may comprise all computer-readable media, with the sole exception being a transitory, propagating signal. For example, the non-transitory computer readable media product 700 may include a non-propagating signal bearing medium 702, a communication medium 704, a non-transitory computer readable medium 706, and a recordable medium 708. The computer readable media product 700 may also include computer instructions 712 when executed by a processing unit (e.g., the controller 218) of the gateway device 200 causing the processing unit to enable the gateway device 200 to facilitate the communication between the first UE in the first network and the second network. More specifically, the communication between the first UE and the second network may be through the second UE, with the second UE in the proximity of the first UE and having the active interface available for the transmission of the data for the first UE.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the present disclosure and their practical application so as to activate others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A wireless communication method between a first network and a second network, wherein the first network comprises UEs including a first UE and a second UE, a gateway device, and a core network, comprising:

enabling the gateway device to learn UE-related parameters of the UEs including operating modes, identity information, and connection status by selectively transmitting a first request to the core network or transmitting a second request to the UEs;

enabling the gateway device to receive the UE-related parameters from the core network in terms of a first set of predetermined messages or from the UEs in terms of a second set of predetermined messages, and broadcast the UE-related parameters to the UEs in terms of a third set of predetermined messages; and enabling the gateway device to coordinate with the UEs allowing for the first UE to facilitate a communication with the second network through the second UE via the core network, depending on an interface operating status of the second UE and a spatial relationship between the first UE and the second UE.

2. The method according to claim 1, further comprising enabling the gateway device to select a third UE through which the first UE facilitates the communication with the second network via the core network, wherein the second UE and the third UE are within a predetermined proximity of the first UE.

3. The method according to claim 2, further comprising enabling the gateway device to determine power consumption associated with facilitating the communication between the first UE and the second network based on a distance between the first UE and the second UE and the third UE.

4. The method according to claim 3, further comprising enabling the gateway device to broadcast the UE-related parameters in terms of the third predetermined set of the messages to the UEs after determining the power consumption associated with facilitating the communication between the first UE and the second network.

5. The method according to claim 1, further comprising enabling the gateway device to update a database thereof after the gateway device learns the UE-related parameters of the UEs.

6. The method according to claim 5, further comprising enabling the gateway device to compare the UE-related parameters with a content of the database before enabling the gateway device to update the database.

7. The method according to claim 1, further comprising enabling the gateway device to transmit the UE-related parameters to the core network through a first network interface.

8. The method according to claim 1, further comprising enabling the gateway device to initiate an attachment process with the core network before enabling the gateway device to learn the UE-related parameters of the UEs by transmitting the first request to the core network via the first network interface of the gateway device.

9. The method according to claim 1, further comprising enabling the gateway device to initiate an attachment process with the UEs before enabling the gateway device to learn the UE-related parameters of the UEs by transmitting the second request to the UEs via a second network interface of the gateway device.

10. A communication system having a first network with multiple UEs, a core network, and a gateway device, and a second network, wherein the gateway device is capable of facilitating a communication between a first UE and the second network, and the gateway device having a first network interface and a second network interface is adapted to:

learn UE-related parameters of the UEs including operating modes, identity information, and connection status by selectively transmitting a first request to the core network via the first network interface thereof, or transmitting a second request to the UEs via the second network interface thereof and receiving the UE-related parameters in a first set of predetermined messages from the core network, or receiving the UE-related parameters in a second set of predetermined messages from the UEs, respectively;

transmit the UE-related parameters via the second network interface thereof to the UEs in terms of a third set of predetermined messages; and coordinate with the UEs to allow for the first UE to facilitate the communication with the second network through the second UE via the core network, depending on interface operating status of the second UE and a spatial relationship between the first UE and the second UE.

11. The communication system according to claim 10, wherein the first network interface is a third generation partnership project (3GPP) standard interface.

12. The communication system according to claim 10, wherein the second network interface is a non-third generation partnership project (non-3GPP) standard interface.

13. The communication system according to claim 10, wherein the gateway device is further adapted to cause the first UE to communicate with the second UE via a non-3GPP interface before causing the second UE to communicate with the second network via the core network and to select a third UE with which the first UE communicates over the non-3GPP interface.

14. The communication system according to claim 13, wherein the gateway device is further adapted to determine power consumption of the second UE associated with facilitating the communication between the first UE and the second network based on a distance between the first UE and the second UE and the third UE.

15. The communication system according to claim 14, wherein the gateway device is further adapted to broadcast the UE-related parameters in terms of the third set of the predetermined messages to the UEs after determining the power consumption associated with facilitating the communication between the first UE and the second network.

16. The communication system according to claim 10, wherein the gateway device is further adapted to update a database thereof after the gateway device learns the UE-related parameters of the UEs.

17. The communication system according to claim 16, wherein the gateway device is further adapted to compare the UE-related parameters with a content of the database before proceeding to update the database thereof.

18. The communication system according to claim 10, wherein the gateway device is further adapted to transmit the UE-related parameters to the core network through the first network interface.

19. The communication system according to claim 10, wherein the first set of the predetermined messages comprises an operating mode, packet data network (PDN) connection, radio resource control (RRC) connection, and proximity service capability of the UEs.

20. The communication system according to claim 10, wherein the second set of the predetermined messages comprises an operating mode, packet data network (PDN) connection, radio resource control (RRC) connection, and proximity service capability of the UEs.

21. The communication system according to claim 10, wherein the third set of the predetermined messages comprises device identity (ID), packet data network (PDN) connection, radio resource control (RRC) connection, interface identity (ID), and connection endpoint of the UEs.

22. A non-transitory computer readable medium comprising a set of computer instructions when executed by a processing unit of a gateway device for facilitating the communication between a first network and a second network, wherein the first network having the gateway device further comprises UEs including a first UE and a second UE and a core network, the computer instructions when executed by the processing unit causing the processing unit to:

enable the gateway device to learn UE-related parameters of the UEs including operating modes, identity information, and connection status by selectively transmitting a first request to the core network or transmitting a second request to the UEs;

enable the gateway device to receive the UE-related parameters from the core network in terms of a first set of predetermined messages or from the UEs in terms of a second set of predetermined messages, and broadcast the UE-related parameters to the UEs in terms of a third set of predetermined messages; and enable the gateway device to coordinate with the UEs allowing for the first UE to facilitate the communication with the second network through the second UE via the core network, depending on an interface operating status of the second UE and a spatial relationship between the first UE and the second UE.

23. The non-transitory computer readable medium according to claim 22, further comprising the computer instructions when executed by the processing unit causing the processing unit to enable the gateway device to select a third UE through which the first UE facilitates the communication with the second network via the core network, wherein the second UE and the third UE is within a predetermined proximity of the first UE.

24. The non-transitory computer readable medium according to claim 23, further comprising the computer instructions when executed by the processing unit causing the processing unit to enable the gateway device to determine power consumption associated with facilitating the communication between the first UE and the second network based on a distance between the first UE and the second UE and the third UE.

25. The non-transitory computer readable medium according to claim 24, further comprising the computer instructions when executed by the processing unit causing the processing unit to enable the gateway device to broadcast the UE-related parameters in terms of the third predetermined set of the messages to the UEs after determining the power consumption associated with facilitating the communication between the first UE and the second network.

26. The non-transitory computer readable medium according to claim 22, further comprising the computer instructions when executed by the processing unit causing the processing unit to enable the gateway device to update a database thereof after the gateway device learns the UE-related parameters of the UEs.

27. The non-transitory computer readable medium according to claim 26, further comprising the computer instructions when executed by the processing unit causing the processing unit to enable the gateway device to compare the UE-related parameters with a content of the database before enabling the gateway device to update the database.

28. The non-transitory computer readable medium according to claim 22, further comprising the computer instructions when executed by the processing unit causing the processing unit to enable the gateway device to transmit the UE-related parameters to the core network through a first network interface.

29. The non-transitory computer readable medium according to claim 22, further comprising the computer instructions when executed by the processing unit causing the processing unit to enable the gateway device to initiate an attachment process with the core network before enabling the gateway device to learn the UE-related parameters of the UEs by transmitting the first request to the core network via the first network interface of the gateway device.

30. The non-transitory computer readable medium according to claim 22 further comprising the computer instructions when executed by the processing unit causing the processing unit to enable the gateway device to initiate an attachment process with the UEs before enabling the gateway device to learn the UE-related parameters of the UEs by transmitting the second request to the UEs via a second network interface of the gateway device.

* * * * *